United States Patent
Saint-Chamant et al.

(10) Patent No.: US 8,743,520 B2
(45) Date of Patent: Jun. 3, 2014

(54) METHOD AND DEVICE FOR PROTECTING AN AUTOTRANSFORMER FOR AN AIRCRAFT

(75) Inventors: Pierre Saint-Chamant, Toulouse (FR); Grigori Marguin, Toulouse (FR); Pierre Henrard, Cazeres (FR)

(73) Assignee: Airbus Operations S.A.S., Toulouse (FR)

( * ) Notice: Subject to any disclaimer, the term of this patent is extended or adjusted under 35 U.S.C. 154(b) by 143 days.

(21) Appl. No.: 13/473,836

(22) Filed: May 17, 2012

(65) Prior Publication Data

US 2013/0043720 A1 Feb. 21, 2013

(30) Foreign Application Priority Data

May 24, 2011 (FR) ...................................... 11 54528

(51) Int. Cl.
*B64D 31/00* (2006.01)
(52) U.S. Cl.
USPC ......................................................... 361/87
(58) Field of Classification Search
USPC .............................................................. 361/87
See application file for complete search history.

(56) References Cited

U.S. PATENT DOCUMENTS

| | | |
|---|---|---|
| 6,507,184 B1 | 1/2003 | Elston |
| 2009/0059447 A1 | 3/2009 | Gajic |
| 2009/0231769 A1 | 9/2009 | Fischer et al. |

OTHER PUBLICATIONS

French Preliminary Search Report issued Mar. 5, 2012, in French 1154528, filed May 24, 2011 (with English Translation of Categories of Cited Documents).
U.S. Appl. No. 13/477,392, filed May 22, 2012, Saint-Chamant, et al.

*Primary Examiner* — Jared Fureman
*Assistant Examiner* — Kevin J Comber
(74) *Attorney, Agent, or Firm* — Oblon, Spivak, McClelland, Maier & Neustadt, L.L.P.

(57) ABSTRACT

The invention relates to a method for protecting a multi-phase autotransformer for an aircraft, including the steps of receiving (100) values of current output from ($I_a$, $I_b$) the first and second phases and a value of current input into ($I_B$) the second phase; determining (101), from these received values of the second phase, a value of current representative of the operation ($I_{Fb}$) of the second phase; determining (102), as a function of this determined value and of the value of current output from ($I_a$) the first phase, a value representative of the homopolar current ($I_{det-a}$) flowing in the first phase; comparing (104) this value of homopolar current ($I_{det-a}$) with a first predetermined threshold value (S1) at least during a first predetermined period (D1); and controlling (106) the values of currents input into ($I_A$, $I_B$) and/or output from ($I_a$, $I_b$) the phases as a function of the said first comparison.

15 Claims, 3 Drawing Sheets

METHOD AND DEVICE FOR PROTECTING AN AUTOTRANSFORMER FOR AN AIRCRAFT

Figure 1:
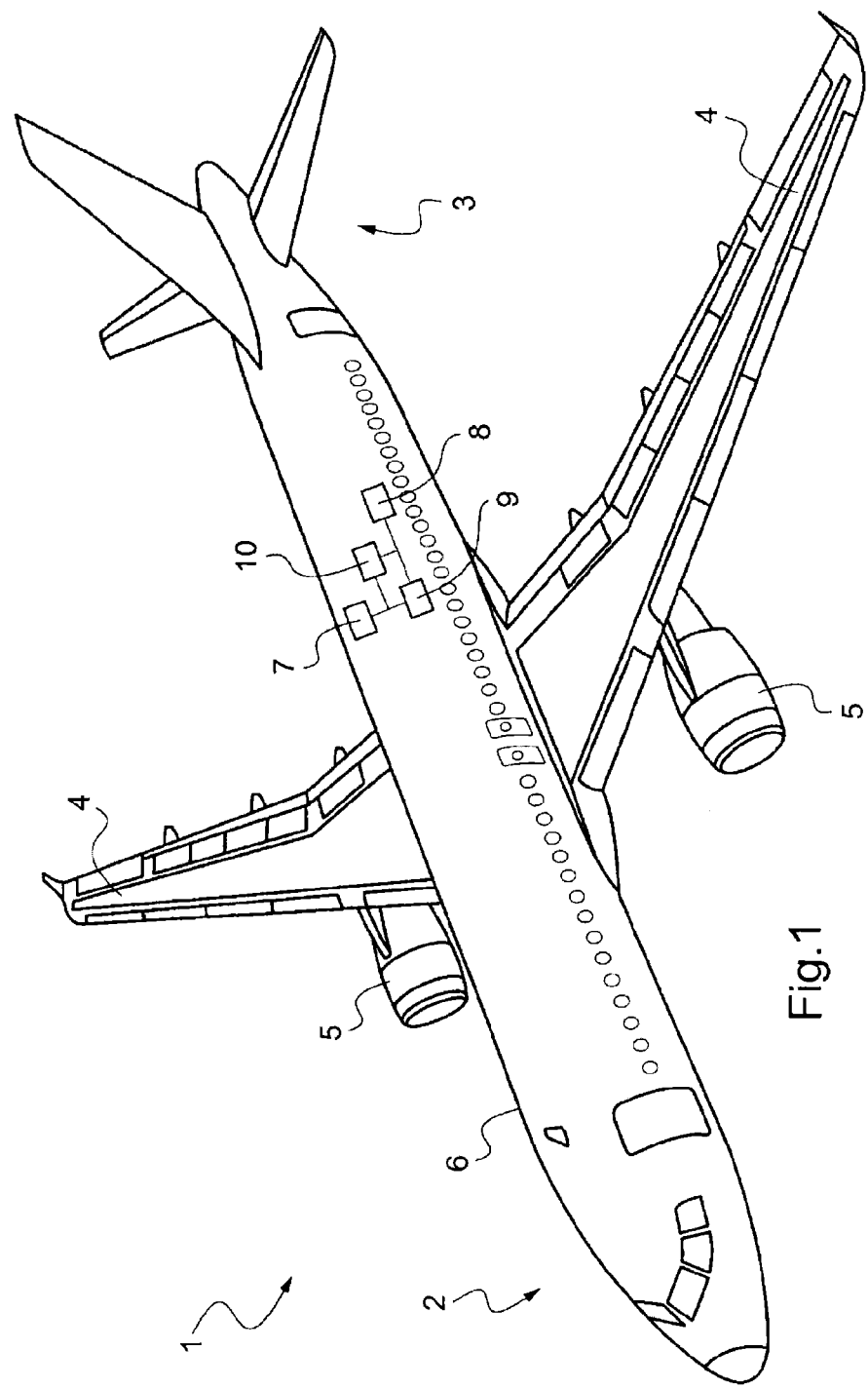

The invention relates to methods for protecting autotransformers for aircraft, and in particular in the case of opening of phases upstream from these autotransformers.

The invention also relates to devices for protecting autotransformers for aircraft, and in particular in the case of opening of phases upstream from these autotransformers.

It is known that aircraft are provided with numerous on-board equipment items that consume electrical energy, even increasingly so.

To generate a sufficient quantity of electrical energy, aircraft are traditionally equipped with rotating electrical machines configured to generate electrical energy having an rms voltage of approximately 115 V.

Each one of such rotating electrical machines has a considerable weight.

For obvious reasons of weight gain, aircraft are now being equipped with rotating electrical machines configured to generate electrical energy having an rms voltage of approximately 230 V, so as to reduce the cross sections of cables in the electrical system in the aircraft.

The latter machines are replacing or even supplementing the machine stock existing traditionally on board aircraft.

However, a stock of traditional machines compatible with those of aircraft and therefore configured to generate electrical energy having an rms voltage of approximately 115 V exists on the ground.

It is more convenient and economical to retain the machine stock existing on the ground.

Consequently, it is necessary to ensure compatibility between an on-board electrical system (in the aircraft) having an rms voltage level of approximately 230 V and an electrical system on the ground having an rms voltage level of approximately 115 V.

For this purpose, the rotating electrical machines with which aircraft are equipped are now autotransformers (known as ATUs) configured to ensure electrical transformation between 230 V and 115 V a.c. voltages in reversible manner (also referred to as 230 VAC/115 VAC ATUs).

The autotransformers generally have star-star coupling between their primary and their secondary and are consequently connected at the neutral in the primary and in the secondary.

When a phase is open (meaning that it is not being supplied) upstream from a three-phase autotransformer of 230 VAC/115 VAC type, a large disequilibrium is generated on the downstream consuming system, in other words on the 115 V side, since the more the electrical loads demand energy, the more the voltage on the open phase collapses.

In addition, the autotransformer may continue to supply three-phase electrical loads connected to this autotransformer by compensating with the other two non-defective phases. In this case, the electrical energy flowing in the primary turns and the secondary turns of the two non-defective phases may be much greater than the nominal energy. This abnormal operation may therefore cause overheating of the autotransformer, especially when the electrical loads are demanding maximum energy.

There are known a method and a device for protecting autotransformers provided with current sensors disposed on each phase of the autotransformer, upstream from the primary turns.

These sensors are configured to measure the value of current input into each phase (also known as leg of the autotransformer).

A monitoring and control unit is configured to receive the values measured by the sensors, then to compare these values with each other and relative to a predetermined threshold during a predetermined period.

The disadvantage of this method for detecting opening of a phase is that the predetermined period must be sufficiently long and the predetermined threshold must be sufficiently high to allow good reliability to be achieved in terms of the detected defect.

The invention aims to provide a protection method capable of detecting opening of a phase of an autotransformer for an aircraft rapidly, precisely and with very great reliability, in simple, convenient and economical manner.

According to a first aspect, the object of the invention is therefore a method for protecting a multi-phase autotransformer for an aircraft, characterized in that it includes the following steps:

receiving at least one value of current output from a first phase of the autotransformer, at least one value of current input into a second phase of the autotransformer and at least one value of current output from this second phase;

determining, at least as a function of the values of currents input into and output from the second phase, at least one value of current representative of the operation of the second phase;

determining, at least as a function of the value of current representative of the operation of the second phase and of the value of current output from the first phase, at least one value representative of the homopolar current flowing in the said first phase;

comparing the value representative of the homopolar current flowing in the said first phase with a first predetermined threshold value at least during a first predetermined period;

controlling the values of current input into and/or output from the phases of the autotransformer as a function of the said first comparison.

To detect the opening of a phase (first phase) upstream from the autotransformer, the method according to the invention is based on a measurement of current on this phase downstream from the autotransformer and on a measurement of current on one other phase (second phase) of the autotransformer, upstream and downstream.

By taking the upstream current and the downstream current on the other phase into account, it is possible to create a reference by hypothesizing that this other phase is not affected by a defect comprising opening of a phase upstream. This therefore makes it possible to determine a value of current representative of the operation (said to be normal) of this other phase. It is to be noted that the upstream and downstream currents of the other phase actually represent the magnetizing current and the homopolar current flowing in this phase (or leg) of the autotransformer. This homopolar current is negligible in nominal operation (in other words without a defect comprising opening of a phase upstream).

As regards the phase for which an attempt is being made to detect if it is open upstream from the autotransformer, if only the current output from this phase is taken into account it illustrates the fact, in contrast to the other phase, that the magnetizing current flowing in this phase is negligible compared with the homopolar current flowing therein due to the fact that this phase is (potentially) open upstream from the autotransformer.

In fact, these homopolar currents flow in the turns of the autotransformer when a disequilibrium associated with the opening of a phase upstream from the autotransformer occurs. These homopolar currents then have an amplitude much larger than the amplitude of the magnetizing current, so that the latter becomes negligible.

By virtue of the invention, the detection of false defects is avoided, and it is possible to have a predetermined threshold value much lower than that of the prior art as well as a period also much shorter than that of the prior art.

In this way the method according to the invention offers the advantage of performing measurements on the phases of the autotransformer that are precise and rapid, thus making it possible to detect defects associated with opening of phases of autotransformers rapidly and with great reliability.

The method according to the invention is therefore particularly effective while being simple, convenient and economical.

According to preferred simple, convenient and economical characteristics of the method according to the invention, it additionally includes the following steps:

comparing the value of current output from the first phase and the value of current output from the second phase with a second predetermined threshold value;

controlling the values of currents input into and/or output from the phases of the autotransformer as a function of the said second comparison.

In this way the method according to the invention offers the advantage of detecting a false defect comprising opening of a phase and, as the case may be, of inhibiting the protection of the autotransformer.

According to preferred simple, convenient and economical characteristics of the method according to the invention:

the step of determining at least one value of current representative of the operation of the second phase is achieved by a difference function of the values of currents input into and output from the second phase, thus making it possible to achieve even greater precision in measurement;

the value of current representative of the operation of the second phase is determined by the difference between n times the value of current input into the second phase and the value of current output from the second phase; n is equal to the transformation ratio of the autotransformer; for example, n is equal to 2;

the step of determining a value representative of the homopolar current flowing in the said first phase is achieved by a function of summing the value of current output from the first phase and the value of current representative of the operation of the second phase, thus making it possible to measure the magnetizing current, the homopolar current and the short-circuit current even more precisely;

the step of controlling as a function of the said first comparison includes zeroing the values of current input into and/or output from each phase when the value representative of the homopolar current flowing in the said first phase is lower than the first predetermined threshold value at least during the first predetermined period, thus making it possible to protect the autotransformer;

the step of controlling as a function of the said second comparison includes preventing zeroing of the values of currents input into and/or output from each phase when the values of currents output from the first phase and from the second phase are each lower than the second predetermined threshold value, thus making it possible to inhibit any zeroing of these currents; and/or the step of controlling by preventing zeroing of the values of input and/or output currents is inhibited when the values of currents output from the first phase and from the second phase are each no longer lower than the second predetermined threshold value at least during a predetermined second period, thus making it possible once again to detect the true internal defects as the case may be.

According to a second aspect, another object of the invention is a device for protecting a multi-phase autotransformer for an aircraft, provided with a monitoring and control unit configured to:

receive at least one value of current output from a first phase of the autotransformer, at least one value of current input into a second phase of the autotransformer and at least one value of current output from this second phase;

determine, at least as a function of the values of currents input into and output from the second phase, at least one value of current representative of the operation of the second phase;

determine, at least as a function of the value of current representative of the operation of the second phase and of the value of current output from the first phase, at least one value representative of the homopolar current flowing in the said first phase;

compare the value representative of the homopolar current flowing in the said first phase with a first predetermined threshold value at least during a first predetermined period;

control the values of currents input into and/or output from the phases of the autotransformer as a function of the said first comparison.

To detect the opening of a phase (first phase) upstream from the autotransformer, the device according to the invention is based on a measurement of current on this phase downstream from the autotransformer and on a measurement of current on another phase (second phase) of the autotransformer upstream and downstream.

By taking the upstream current and the downstream current on the other phase (in other words at the input of the turns of the primary and at the output of the turns of the secondary) into account, it is possible to create a reference by hypothesizing that this other phase is not affected by a defect comprising opening of a phase upstream. This therefore makes it possible to determine a value of current representative of the operation (said to be normal) of this other phase. It is to be noted that the upstream and downstream currents of the other phase actually represent the magnetizing current and the homopolar current flowing in this phase (or leg) of the autotransformer. This homopolar current is negligible in nominal operation (in other words without defect comprising opening of a phase upstream).

As regards the phase for which an attempt is being made to detect if it is open upstream from the autotransformer, if only the current output from this phase is taken into account it illustrates the fact, in contrast to the other phase, that the magnetizing current flowing in this phase is negligible compared with the homopolar current flowing therein due to the fact that this phase is (potentially) open upstream from the autotransformer.

In fact, these homopolar currents flow in the turns of the autotransformer when a disequilibrium associated with opening of a phase upstream from the autotransformer occurs. These homopolar currents then have an amplitude much higher than the amplitude of the magnetizing current, so that the latter becomes negligible.

By virtue of the invention, the detection of false defects is avoided, and it is possible to have a predetermined threshold value much lower than that of the prior art as well as a period also much shorter than that of the prior art.

In this way the device according to the invention offers the advantage of performing measurements on the phases of the autotransformer that are precise and rapid, thus making it possible to detect defects related to opening of phases of autotransformers rapidly and with great reliability.

The device according to the invention is therefore particularly effective while being simple, convenient and economical.

According to preferred simple, convenient and economical characteristics of the device according to the invention:
  the device is provided with measuring instruments configured to perform measurements of values of current input into and output from each phase of the autotransformer;
  the said instruments are current transformers, which makes it possible to perform very precise measurements;
  the device is provided with at least one main contactor disposed upstream and/or downstream from the autotransformer and configured to act on the opening/closing of the phases upstream and/or downstream from the autotransformer thus making it easily possible to control the value of current input into the autotransformer; and/or
  the said at least one main contactor is provided with a phase contactor on each phase of the autotransformer, thus making it possible to trigger this control very rapidly.

According to a third aspect, another object of the invention is an aircraft equipped with at least one multi-phase autotransformer and at least one protective device such as described above.

According to preferred simple, convenient and economical characteristics, the aircraft is provided with a three-phase electrical supply system having an rms voltage of approximately 230 V, which is connected upstream to the autotransformer, an electrical consuming system having an rms voltage of approximately 115 V, which is connected downstream to the autotransformer, and the said autotransformer is three-phase and configured to transform the rms voltage of approximately 230 V to an rms voltage of approximately 115 V.

Figure 2:
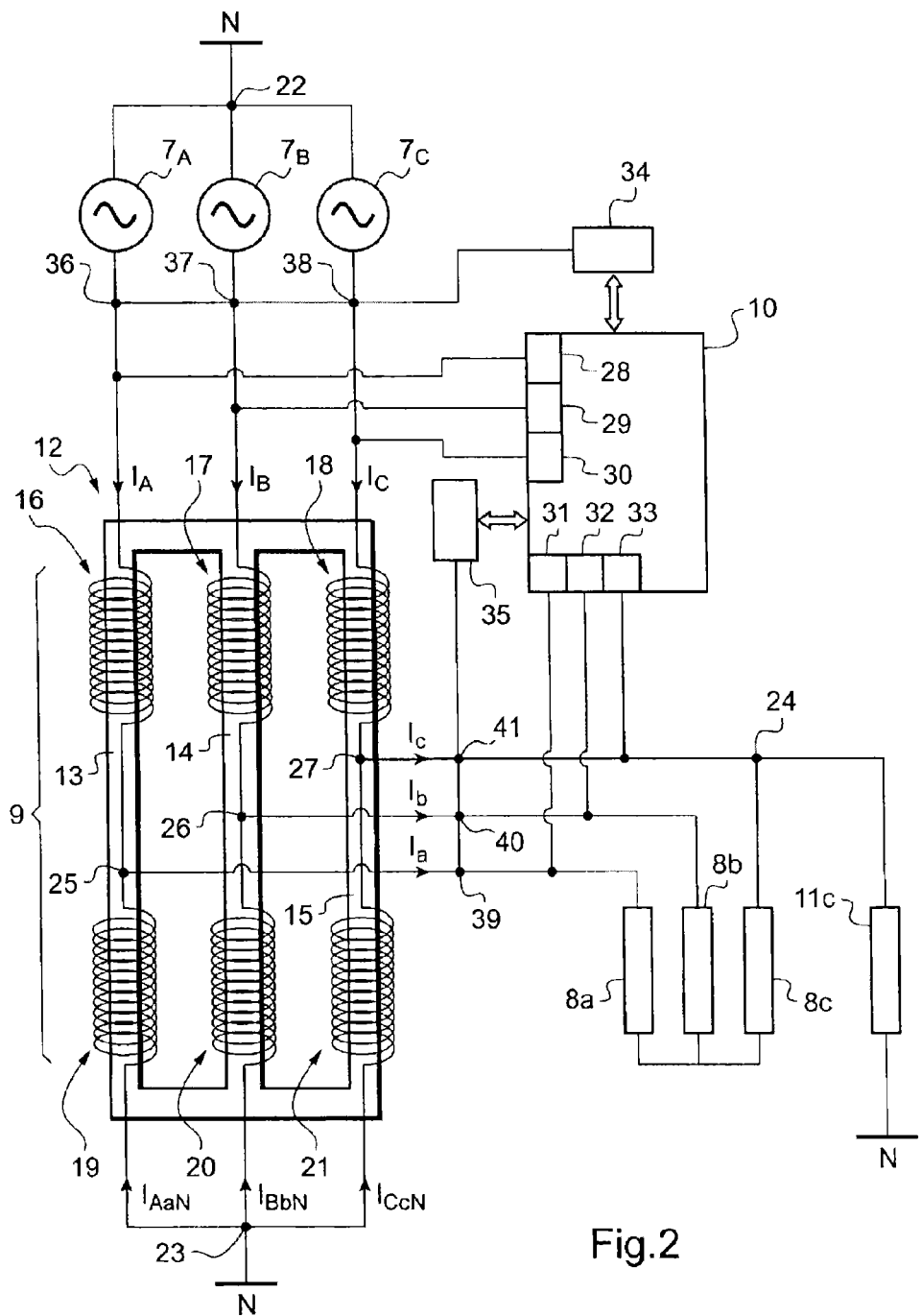
Figure 3:
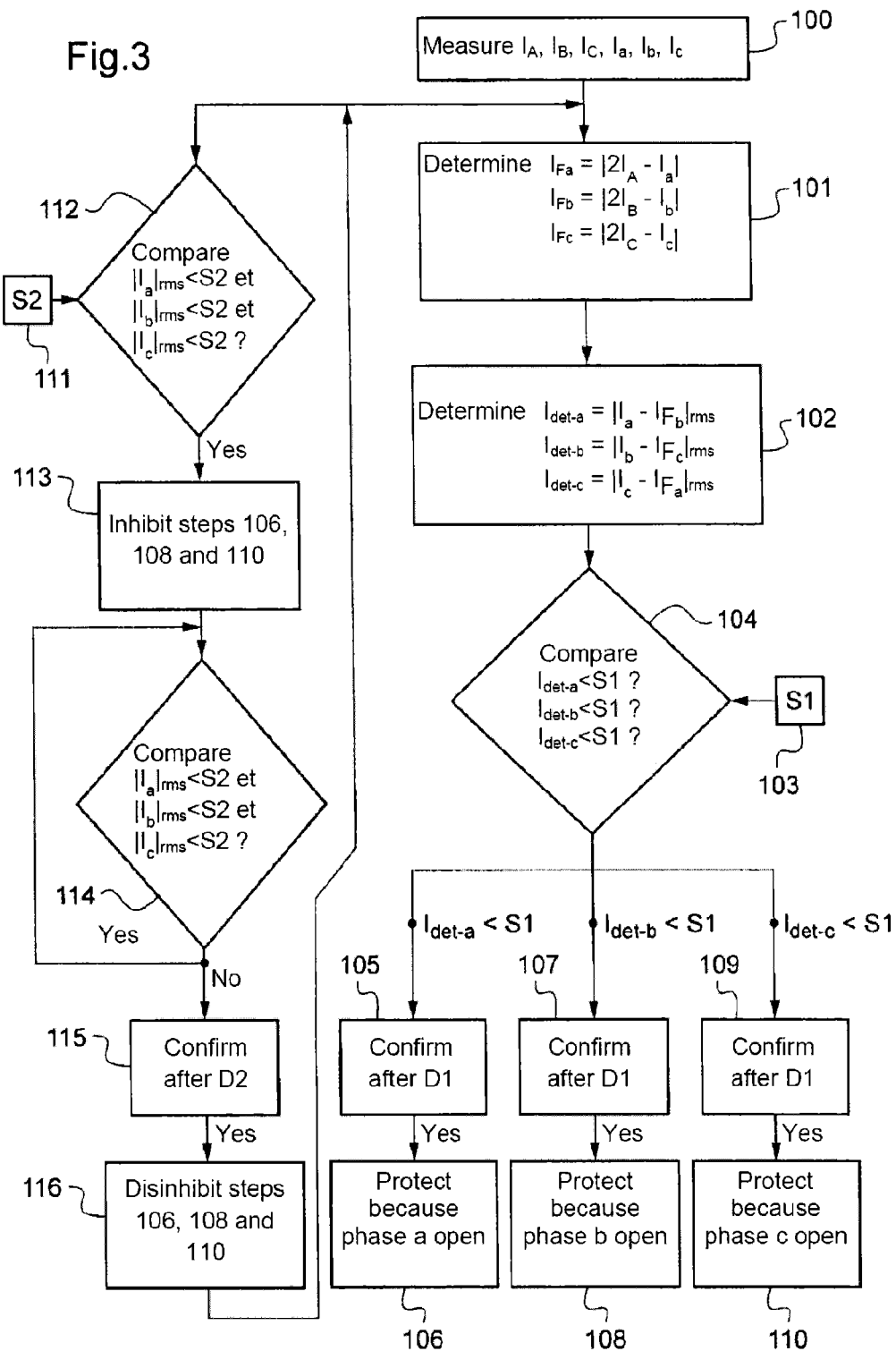

The explanation of the invention will now be continued by the description of an exemplary embodiment, provided below for illustrative but not limitative purposes, with reference to the attached drawings, wherein:

FIG. 1 schematically represents a perspective view of an aircraft provided in particular with an autotransformer and a protective device in conformity with one embodiment of the invention;

FIG. 2 schematically and partially represents the electrical circuit of the aircraft; and FIG. 3 is a block diagram illustrating different steps of operation of a protective method employed by the protective device.

FIG. 1 illustrates an aircraft 1 provided with a fuselage 6, which has a front part 2 and a rear part 3, wings 4, each joined to fuselage 6 at a central part thereof, and two engines 5, wherein each of these engines 5 is fixed to a lower wall of a respective wing 4 and extends from respective wing 4, parallel to fuselage 6, toward front part 2 of aircraft 1.

This aircraft 1 is additionally equipped with an electrical supply system 7 provided with three-phase electrical supply sources 7A, 7B, 7C (FIG. 2), traditionally formed by rotating electrical machines.

Aircraft 1 is additionally equipped with an electrical consuming system 8 provided with three-phase electrical consuming sources 8a, 8b, 8c and single-phase electrical consuming source 11c, also referred to as three-phase loads and single-phase load respectively.

Aircraft 1 is additionally equipped with at least one multi-phase autotransformer 9 interposed between electrical supply system 7 and electrical consuming system 8.

In the present case, the autotransformer is three-phase and is configured to connect supply system 7 electrically to consuming system 8.

Aircraft 1 therefore has a multi-phase electrical system that in the present case is provided with three phases leading from electrical supply system 7 to electrical consuming system 8 by passing through autotransformer 9.

These three phases, denoted phase a, phase b and phase c, therefore each has an upstream portion extending from electrical supply system 7 to the input of autotransformer 9, a downstream portion extending from the output of autotransformer 9 to electrical consuming system 8 and an internal portion inside autotransformer 9.

Aircraft 1 is additionally equipped with a protective device, in the present case formed in particular by a monitoring and control unit 10 connected electrically at least to each of the phases upstream from autotransformer 9 and downstream from autotransformer 9.

This monitoring and control unit 10 is configured to receive representative information such as the values of current obtained by measurements performed on each of these phases.

This monitoring and control unit 10 is additionally configured to process the information that it receives, to run data comparisons and to control, as a function of these comparisons, input currents IA, IB, IC and output currents Ia, Ib, Ic of autotransformer 9.

FIG. 2 illustrates the electrical circuit connecting the electrical supply system to the electrical consuming system by way of autotransformer 9.

Three-phase electrical supply sources 7A, 7B and 7C are interconnected at a first neutral point 22, which is also referred to as the neutral point of the upstream system and is connected to a neutral line represented by the symbol N.

These electrical supply sources 7A, 7B and 7C deliver electrical energy that in the present case has a three-phase a.c. rms voltage of 230 V.

The three phases a, b, c draw their source from upstream supply system 7 and are directed toward autotransformer 9.

Autotransformer 9 has a magnetic circuit 12, which is closed and in the present case is provided with three legs, respectively a first leg 13, a second leg 14 and a third leg 15. These legs 13, 14 and 15 respectively form the core of a respective phase.

First leg 13 forms the core of phase a, second leg 14 forms the core of phase b and third leg 15 forms the core of phase c.

Autotransformer 9 additionally has primary coils and common coils forming in particular the secondary coils.

In fact, in an autotransformer, the secondary is formed by a part of the primary winding so that the supply current (primary) passes though the corresponding primary coil and the corresponding common coil in its entirety, whereas the output current (secondary) passes through only the corresponding common coil, by virtue of a tap at a given point thereof that determines the output of the secondary. In this way only the primary currents pass through the primary coils whereas the algebraic sum of the primary and secondary currents passes through the common coils.

In the present case, autotransformer 9 has, on phase a (also known as first phase), a first primary coil 16, also known as primary coil of phase a, a first common coil 19, also known as common coil of phase a, and a first tap point 25 disposed between first primary coil 16 and first common coil 19.

It is understood that these first primary and common coils 16 and 19 respectively are formed by turns wound around core 13 of phase a.

The input current on the portion of phase a internal to autotransformer 9 is denoted IA and the output current is denoted Ia.

Input current IA is obtained from supply source 7A, and current Ia is directed toward load 8a.

In the present case, autotransformer 9 has, on phase b (also known as second phase), a second primary coil 17, also known as primary coil of phase b, a second common coil 20, also known as common coil of phase b, and a second tap point 26 disposed between second primary coil 17 and second common coil 20.

It is understood that these second primary and common coils 17 and 20 respectively are formed by turns wound around core 14 of phase b.

The input current on the portion of phase b internal to autotransformer 9 is denoted IB and the output current is denoted Ib.

Input current IB is obtained from supply source 7B, and current Ib is directed toward load 8b.

In the present case, autotransformer 9 has, on phase c (also known as third phase), a third primary coil 18, also known as primary coil of phase c, a third common coil 21, also known as common coil of phase c, and a third tap point 27 disposed between third primary coil 18 and third common coil 21.

It is understood that these third primary and common coils 18 and 21 respectively are formed by turns wound around core 15 of phase c.

The input current on the portion of phase c internal to autotransformer 9 is denoted IC and the output current is denoted Ic.

Input current IC is obtained from supply source 7C, and current Ic is directed toward load 8c.

The three common coils 19, 20 and 21 are interconnected at a second neutral point 23, referred to as neutral point of autotransformer 9.

In the present case, autotransformer 9 therefore has coupling of the star-star type, meaning that it is connected to the neutral upstream and downstream.

A three-phase system is formed by three alternating variables of the same nature and same frequency. Three sinusoidal variables form an equilibrated system if they have the same rms values and if they have a regular phase shift between them. However, if the system is disequilibrated, for example because of a defect upstream and/or downstream from autotransformer 9, the operation of the circuit cannot be analyzed directly because the value to be allocated to the impedance of the various elements is not known. It is then considered that the disequilibrated system is formed by three systems, the direct system, the inverse system and the homopolar system.

It is considered that all the systems represented by vectors grouped in star configuration have the same direct and inverse components. Consequently, it is considered that only the homopolar component, in other words the homopolar current, is capable of flowing in the phases of autotransformer 9 while having a non-negligible amplitude when a defect occurs. The three currents IAaN, IBbN and ICcN coming from the neutral and flowing respectively in the phases are represented in FIG. 2 as extending from neutral line N at the second neutral point 23.

Autotransformer 9 has a transformation ratio between the input voltage and the output voltage that permits it to deliver, at the output, a three-phase a.c. voltage having an rms value of approximately 115 V.

This transformation ratio is equal to the ratio of the number of turns in which the secondary current flows to the number of turns in which the primary current flows, or to the inverse, since the autotransformer is reversible and so also is the detection method.

The electrical consuming system is formed in FIG. 2 from three three-phase electrical loads 8a, 8b and 8c, all three of which are interconnected at one end and which are additionally connected at another end to the respective phases.

These loads 8a, 8b and 8c are therefore electrically supplied by currents Ia, Ib and Ic respectively.

In the present case, the electrical consuming system is additionally formed by a single-phase load 11c connected on the one hand to neutral line N and on the other hand to phase c at a fourth tap point 24, to which three-phase load 8c is also connected.

This fourth tap point 24 is also referred to as tap point for the three-phase and single-phase loads on phase c.

Monitoring and control unit 10 is provided with a microprocessor (not represented) equipped with a memory (not represented), in particular nonvolatile, permitting it to load and store information, and with a software routine which, when executed in the microprocessor, permits the employment of a detection method according to the invention.

This nonvolatile memory is, for example, of ROM type ("Read Only Memory").

Monitoring and control unit 10 is additionally provided with a memory (not represented), in particular volatile, making it possible to store data in memory during execution of the software and employment of the method.

This volatile memory is, for example, of RAM or EEPROM type (respectively "Random Access Memory" and "Electrically Erasable Programmable Read Only Memory").

This monitoring and control unit 10 may be provided, for example, with a microcontroller or an ASIC ("Application-Specific Integrated Circuit").

This monitoring and control unit 10 is configured such that it can dynamically receive information representative, directly in the present case, of measured values of input currents IA, IB and IC and of output currents Ia, Ib and Ic.

The protective device is additionally provided with current transformers 28, 29, 30, 31, 32 and 33, which are separated from autotransformer 9 in order to be in a less constraining thermal environment.

In the present case these current transformers 28, 29, 30, 31, 32 and 33 are of the nanocrystalline core type and they measure the values of currents IA, IB, IC, Ia, Ib and Ic.

In the present case, current transformers 28 to 33 (which are actually specific measuring transducers) are directly integrated into monitoring and control unit 10 and are each connected respectively to the corresponding phase upstream and/or downstream from autotransformer 9.

In the present case, current transformers 28, 29, 30, 31, 32 and 33 are connected respectively to the upstream portions of the phases and to the downstream portions of phases a, b and c.

This monitoring and control unit 10 therefore directly receives values of current input into each phase of autotransformer 9 and output from each phase of this autotransformer 9.

The protective device is also provided with main contactors 34 and 35, with which monitoring and control unit 10 is configured to communicate, and in particular to send orders.

Contactor 34 is referred to as upstream main contactor, because it is provided with three phase contactors, respectively a phase a contactor 36 disposed on the upstream portion of phase a, a phase b contactor 37 disposed on the upstream portion of phase b, and a phase c contactor 38 disposed on the upstream portion of phase c.

These upstream phase contactors 36 to 38 permit the opening and/or closing of the respective phase on which each contactor is mounted.

These upstream phase contactors 36 to 38 are controlled by upstream main contactor 34.

Contactor 35 is referred to as downstream main contactor, because it is provided with three phase contactors, respectively a phase a contactor 39 disposed on the downstream portion of phase a, a phase b contactor 40 disposed on the downstream portion of phase b, and a phase c contactor 41 disposed on the downstream portion of phase c.

These downstream phase contactors 39 to 41 permit the opening and/or closing of the respective phase on which each contactor is mounted.

These downstream phase contactors 39 to 41 are controlled by upstream main contactor 35.

Autotransformer 9 makes it possible to reduce the weight in aircraft 1 and it ensures compatibility with the stock of electrical machines on the ground that are configured to deliver an rms voltage of approximately 230 V.

Since autotransformer 9 is connected to neutral line N, it is able to continue supplying three-phase loads 8a, 8b and 8c even when one of these phases is open on its upstream portion, in other words on the 230 V side.

This abnormal operation may cause overheating of autotransformer 9, especially when three-phase electrical loads 8a, 8b and 8c are demanding maximum power.

It is necessary to have a protection method capable of detecting opening of a phase upstream from autotransformer 9 rapidly and particularly reliably, with the goal of avoiding detection of false defects.

FIG. 3 is a block diagram of steps permitting protection of autotransformer 9 by detection of opening of any one of the phases; and by inhibiting this detection when autotransformer 9 is not supplying any electrical load, on the 115 V side.

For this purpose, current transformers 28 to 33 respectively measure the values of input current IA, IB, IC and of output current Ia, Ib, Ic, and monitoring unit of two controls 10 receives these values of current in step 100.

From these values of current, monitoring and control unit 10 determines, in step 101, an instantaneous value of current representative of the operation of corresponding phase IFa, IFb and IFc by calculating, for each of these values, the value of the result of subtraction between two times the instantaneous current input into the corresponding phase and the instantaneous current output from this same phase.

The calculations performed in step 101 by monitoring and control unit 10 are formulated in the following manner:

$$\begin{cases} I_{Fa} = |2 \times I_A - I_a| \\ I_{Fb} = |2 \times I_B - I_b| \\ I_{Fc} = |2 \times I_C - I_c| \end{cases}$$

These values of current representative of the operation of each phase actually measure, in each leg 13 to 15 of autotransformer 9, the magnetizing current in this phase as well as the homopolar current, which is negligible during nominal operation but non-negligible in case of opening of a phase upstream from autotransformer 9.

Monitoring and control unit 10 then determines, in step 102, values representative of the homopolar current Idet-a, Idet-b and Idet-c flowing in each of the phases for the corresponding phases by calculating, for each of these values, the absolute value of the sum among the output current on the corresponding phase and the value of current representative of the operation of this phase determined previously in step 101.

The calculations performed in step 102 by monitoring and control unit 10 are formulated in the following manner:

$$\begin{cases} I_{det-a} = |I_a - I_{Fb}|_{rms} \\ I_{det-b} = |I_b - I_{Fc}|_{rms} \\ I_{det-c} = |I_c - I_{Fa}|_{rms} \end{cases}$$

In this calculation step, if only the current output from the corresponding phase for which an attempt is being made to detect if it is open upstream from autotransformer 9 is taken into account, it illustrates the fact that the magnetizing current flowing in this phase is negligible compared with the homopolar current flowing therein due to the fact that this corresponding phase is (potentially) open upstream from autotransformer 9. In addition, the comparison is carried out with the value of current representative of the operation of another phase, which itself is considered, by hypothesis, as operating normally, in other words without any defect comprising opening of a phase upstream.

Monitoring and control unit 10 then compares, in step 104, each of the values representative of homopolar current Idet-a, Idet-b and Idet-c flowing in the corresponding phase with a first predetermined threshold value S1 previously received by monitoring and control unit 10 in a step 103.

To detect if one of the phases is open, monitoring and control unit 10 verifies, in step 104, if the value representative of the homopolar current flowing in the corresponding phase is lower than this first threshold value S1, which in the present case is equal to approximately 10 A (in rms value).

The calculations performed by monitoring and control unit 10 in step 104 are formulated in the following manner:

$$\begin{cases} I_{det-a} < S1? \\ I_{det-b} < S1? \\ I_{det-c} < S1? \end{cases}$$

When the value Idet-a representative of the homopolar current flowing in phase a is lower than S1, then monitoring and control unit 10 verifies, in step 105, that this result is confirmed after a first predetermined period D1, which in the present case is equal to approximately 40 ms.

If this is the case, in other words if this result is confirmed after the period D1, then monitoring and control unit 10 makes the decision to protect autotransformer 9 in step 106, because phase a is then open. For this purpose, monitoring and control unit 10 sends an order to open the upstream portion of phase a at upstream main contactor 34, which complies with this order by controlling the opening of phase a contactor 36 but also the opening of phase b and c contactors 37 and 38.

In this way autotransformer 9 is protected from a short circuit on its portions of phases a, b and c.

When the value Idet-b representative of the homopolar current flowing in phase b is lower than S1, then monitoring and control unit 10 verifies, in step 107, that this result is confirmed after this first predetermined period D1, which in the present case is equal to approximately 40 ms.

If this is the case, in other words if this result is confirmed after the period D1, then monitoring and control unit 10 makes the decision to protect autotransformer 9 in step 108, because phase b is then open. For this purpose, monitoring and control unit 10 sends an order to open the upstream portion of phase b at upstream main contactor 34, which complies with this order by controlling the opening of phase b contactor 37 but also the opening of phase a and c contactors 36 and 38.

In this way autotransformer 9 is protected from a short circuit on its portions of phases a, b and c.

When the value Idet-c representative of the homopolar current flowing in phase c is lower than S1, then monitoring and control unit 10 verifies, in step 109, that this result is confirmed after this first predetermined period D1, which in the present case is equal to approximately 40 ms.

If this is the case, in other words if this result is confirmed after the period D1, then monitoring and control unit 10 makes the decision to protect autotransformer 9 in step 110, because phase c is then open. For this purpose, monitoring and control unit 10 sends an order to open the upstream portion of phase c at upstream main contactor 34, which complies with this order by controlling the opening of phase c contactor 38 but also the opening of phase a and b contactors 36 and 37.

In this way autotransformer 9 is protected from a short circuit on its portions of phases a, b and c.

In this way autotransformer 9 is protected from an internal short circuit on all these phases.

In parallel with steps 101 to 110, monitoring and control unit 10 is configured to compare, in step 112, the value of current output from each phase 1a, 1b and 1c in absolute value with a second predetermined threshold value S2 previously received by monitoring and control unit 10 in a step 111.

In the present case, second predetermined threshold value S2 is equal to 20 A in rms value.

The comparison is carried out by monitoring and control unit 10 by calculating if the absolute value of the current output from each phase is lower than S2.

Expressed otherwise, the calculations performed in step 112 may be written in the following manner:

$$\begin{cases} |I_a|_{rms} < S2 \\ \text{and} \\ |I_b|_{rms} < S2 \\ \text{and} \\ |I_c|_{rms} < S2? \end{cases}$$

If such is the case, in other words if the absolute values of currents Ia, Ib and Ic are each lower than S2, then monitoring and control unit 10 switches to step 113, which is a step of inhibition of steps 106, 108 and 110 corresponding to protection of autotransformer 9.

This inhibition corresponds to monitoring of the values of currents input into autotransformer 9, such that zeroing thereof is prevented.

The comparison performed in step 112 for each of the currents output from autotransformer 9 makes it possible to detect when this autotransformer 9 is not supplying any electrical load on the 115 V side. If this comparison is positive, it means that autotransformer 9 is not supplying any load on the consuming system.

As the case may be, steps 101 to 105 employed by monitoring and control unit 10 would be able to detect the presence of a false defect, and it is necessary to inhibit steps 106, 108 and 110 so as not to protect autotransformer 9 because of such a false defect.

Monitoring and control unit 10 then performs, in step 114, the same comparison as in step 112, and it reiterates this comparison in the case that the latter is positive, while maintaining inhibition of steps 106, 108 and 110.

In the case that this comparison is negative, monitoring and control unit 10 verifies that this negative result of comparison is confirmed after a second predetermined period D2, in step 115.

In the present case, this second predetermined period D2 is approximately equal to 20 ms.

When the negative result of the comparison performed in step 114 is confirmed in step 115 by monitoring and control unit 10, the latter disinhibits steps 106, 108 and 110 in step 116, since in this case autotransformer 9 is supplying electrical loads on the electrical consuming system.

After these steps 106, 108 and 110 for protection of autotransformer 9 have been disinhibited, steps 104 to 110 may be employed, as may steps 102 and 112 to 116 on the basis of dynamic measurements performed in step 100.

The values of S1, D1, S2 and D2 are typical of a three-phase autotransformer having a nominal active power of approximately 60 kVA.

Of course, these values of S1, D1, S2 and D2 may change as a function of the circumstances, in particular as a function of the autotransformer being used.

In variants that are not illustrated:
the current transformers are not installed in the monitoring and control unit but instead are installed directly on the phases or elsewhere in the device;
the monitoring and control unit does not send open/close orders upstream from the autotransformer on the phases, but instead sends them downstream from the autotransformer on the phases;
the upstream and downstream main contactors are not separate from the monitoring and control unit, but instead are directly integrated into it;
more generally, the value of the magnetizing current is determined on the basis in particular of n times the current input to a phase, where n corresponds to the transformation ratio of the autotransformer; and/or
the autotransformer has a transformation ratio different from that (equal to 2) which makes it possible to transform a three-phase a.c. voltage of 230 V into a three-phase a.c. voltage of 115 V, and these voltage values may well be different;
the transformation ratio of the autotransformer is not equal to 2 but instead is equal to 0.5 in the case in which the autotransformer is used reversibly, for example with the stock of electrical machines on the ground.

It is recalled more generally that the invention is not limited to the examples described and represented.

The invention claimed is:

1. A method for protecting a multi-phase autotransformer for an aircraft, the method comprising:
receiving at least one value of current output from $(I_a, I_b, I_c)$ a first phase of the autotransformer, at least one value of current input into $(I_A, I_B, I_C)$ a second phase of the autotransformer and at least one value of current output from $(I_a, I_b, I_c)$ the second phase;
determining, at least as a function of the values of currents input into $(I_A, I_B, I_C)$ and output from $(I_a, I_b, I_c)$ the second phase, at least one value of current representative of the operation ($I_{Fa}$, $I_{Fb}$, $I_{Fc}$) of the second phase;

determining, at least as a function of the value of current representative of the operation ($I_{Fa}$, $I_{Fb}$, $I_{Fc}$) of the second phase and of the value of current output from ($I_a$, $I_b$, $I_c$) the first phase, at least one value representative of the homopolar current ($I_{det-a}$, $I_{det-b}$, $I_{det-c}$) flowing in the first phase;

comparing the value representative of the homopolar current ($I_{det-a}$, $I_{det-b}$, $I_{det-c}$) flowing in the first phase with a first predetermined threshold value (S1) at least during a first predetermined period (D1); and controlling the values of currents input into ($I_A$, $I_B$, $I_C$) or output from ($I_a$, $I_b$, $I_c$) the phases of the autotransformer as a function of the comparing.

2. The method according to claim 1, further comprising:

second comparing the value of current output from ($I_a$, $I_b$, $I_c$) the first phase and the value of current output from ($I_a$, $I_b$, $I_c$) the second phase with a second predetermined threshold value (S2); and controlling the values of currents input into ($I_A$, $I_B$, $I_C$) or output from ($I_a$, $I_b$, $I_c$) the phases of the autotransformer as a function of the second comparing.

3. The method according to claim 1, wherein the step of determining at least one value of current representative of the operation ($I_{Fa}$, $I_{Fb}$, $I_{Fc}$) of the second phase is achieved by a difference function of the values of current input into ($I_A$, $I_B$, $I_C$) and output from ($I_a$, $I_b$, $I_c$) the second phase.

4. The method according to claim 3, wherein the value of current representative of the operation ($I_{Fa}$, $I_{Fb}$, $I_{Fc}$) of the second phase is determined by the difference between n times the value of current input into ($I_A$, $I_B$, $I_C$) the second phase and the value of current output from ($I_a$, $I_b$, $I_c$) the second phase.

5. The method according to claim 4, wherein n is equal to transformation ratio of the autotransformer, n being equal to 2.

6. The method according to claim 1, wherein the step of determining a value representative of the homopolar current ($I_{det-a}$, $I_{det-b}$, $I_{det-c}$) flowing in the first phase is achieved by a function of summing the value of current output from ($I_a$, $I_b$, $I_c$) the first phase and the value of current representative of the operation ($I_{Fa}$, $I_{Fb}$, $I_{Fc}$) of the second phase.

7. The method according to claim 2, wherein the step of controlling as a function of the comparing includes zeroing the values of current input into ($I_A$, $I_B$, $I_C$) or output from ($I_a$, $I_b$, $I_c$) each phase when the value representative of the homopolar current ($I_{det-a}$, $I_{det-b}$, $I_{det-c}$) flowing in the first phase is lower than the first predetermined threshold value (S1) at least during the first predetermined period (D1).

8. The method according to claim 7 wherein the step of controlling as a function of the second comparing includes preventing zeroing of the values of currents input into ($I_A$, $I_B$, $I_C$) or output from ($I_a$, $I_b$, $I_c$) each phase when the values of currents output from ($I_a$, $I_b$, $I_c$) the first phase and the second phase are lower than the second predetermined threshold value (S2).

9. The method according to claim 8, wherein the step of controlling by preventing zeroing of the values of input ($I_A$, $I_B$, $I_C$) or output ($I_a$, $I_b$, $I_c$) currents is inhibited when the values of currents output from ($I_a$, $I_b$, $I_c$) the first phase and the second phase each are no longer lower than the second predetermined threshold value (S2) at least during a predetermined second period (D2).

10. A device for protecting a multi-phase autotransformer for an aircraft, comprising:

a monitoring and control unit configured to receive at least one value of current output from ($I_a$, $I_b$, $I_c$) a first phase of the autotransformer, at least one value of current input into ($I_A$, $I_B$, $I_C$) a second phase of the autotransformer and at least one value of current output from ($I_a$, $I_b$, $I_c$) the second phase;

determine, at least as a function of the values of currents input into ($I_A$, $I_B$, $I_C$) and output from ($I_a$, $I_b$, $I_c$) the second phase, at least one value of current representative of the operation ($I_{Fa}$, $I_{Fb}$, $I_{Fc}$) of the second phase;

determine, at least as a function of the value of current representative of the operation ($I_{Fa}$, $I_{Fb}$, $I_{Fc}$) of the second phase and of the value of current output from ($I_a$, $I_b$, $I_c$) the first phase, at least one value representative of the homopolar current ($I_{det-a}$, $I_{det-b}$, $I_{det-c}$) flowing in the first phase;

compare the value representative of the homopolar current ($I_{det-a}$, $I_{det-b}$, $I_{det-c}$) flowing in the first phase with a first predetermined threshold value (S1) at least during a first predetermined period (D1); and control the values of currents input into ($I_A$, $I_B$, $I_C$) or output from ($I_a$, $I_b$, $I_c$) the phases of the autotransformer as a function of comparison of the value representative of the homopolar current ($I_{det-a}$, $I_{det-b}$, $I_{det-c}$) flowing in the first phase with the first predetermined threshold value (S1).

11. The device according to claim 10, further comprising measuring instruments configured to perform measurements of values of currents input into ($I_A$, $I_B$, $I_C$) and output from ($I_a$, $I_b$, $I_c$) each phase of the autotransformer.

12. The device according to claim 10, further comprising at least one main contactor disposed upstream or downstream from the autotransformer and configured to act on the opening or closing of the phases upstream or downstream from the autotransformer.

13. The device according to claim 12, wherein the at least one main contactor is provided with a phase contactor on each phase of the autotransformer.

14. An aircraft comprising:
at least one multi-phase autotransformer; and
at least one protective device configured to receive at least one value of current output from ($I_a$, $I_b$, $I_c$) a first phase of the autotransformer, at least one value of current input into ($I_A$, $I_B$, $I_C$) a second phase of the autotransformer and at least one value of current output from ($I_a$, $I_b$, $I_c$) the second phase, determine, at least as a function of the values of currents input into ($I_A$, $I_B$, $I_C$) and output from ($I_a$, $I_b$, $I_c$) the second phase, at least one value of current representative of the operation ($I_{Fa}$, $I_{Fb}$, $I_{Fc}$) of the second phase, determine, at least as a function of the value of current representative of the operation ($I_{Fa}$, $I_{Fb}$, $I_{Fc}$) of the second phase and of the value of current output from ($I_a$, $I_b$, $I_c$) the first phase, at least one value representative of the homopolar current ($I_{det-a}$, $I_{det-b}$, $I_{det-c}$) flowing in the first phase, compare the value representative of the homopolar current ($I_{det-a}$, $I_{det-b}$, $I_{det-c}$) flowing in the first phase with a first predetermined threshold value (S1) at least during a first predetermined period (D1), and control the values of currents input into ($I_A$, $I_B$, $I_C$) or output from ($I_a$, $I_b$, $I_c$) the phases of the autotransformer as a function of comparison of the value representative of the homopolar current ($I_{det-a}$, $I_{det-b}$, $I_{det-c}$) flowing in the first phase with the first predetermined threshold value (S1).

15. The aircraft according to claim 14, further comprising a three-phase electrical supply system having an rms voltage of approximately 230 V, which is connected upstream to the autotransformer, an electrical consuming system having an rms voltage of approximately 115 V, which is connected downstream to the autotransformer, wherein the autotransformer is three-phase and configured to transform the rms voltage of approximately 230 V to an rms voltage of approximately 115 V.

* * * * *